(12) United States Patent
Mason et al.

(10) Patent No.: US 8,256,710 B2
(45) Date of Patent: Sep. 4, 2012

(54) LIVE TRIM TABS

(75) Inventors: Garth L. Mason, Springville, UT (US); Lane G. Taylor, American Fork, UT (US); Daniel E. Cooney, Springville, UT (US)

(73) Assignee: Spectrum Aeronautical, LLC, Carlsbad, CA (US)

( * ) Notice: Subject to any disclaimer, the term of this patent is extended or adjusted under 35 U.S.C. 154(b) by 911 days.

(21) Appl. No.: 11/855,342

(22) Filed: Sep. 14, 2007

(65) Prior Publication Data

US 2009/0072085 A1    Mar. 19, 2009

(51) Int. Cl.
*B64C 5/10* (2006.01)
*B64C 3/50* (2006.01)

(52) U.S. Cl. ................ 244/99.14; 244/213; 244/215
(58) Field of Classification Search ............... 244/99.14, 244/213, 215–217
See application file for complete search history.

(56) References Cited

U.S. PATENT DOCUMENTS

| | | | |
|---|---|---|---|
| 1,803,498 A | 5/1931 | Chilton | |
| 2,319,675 A | 5/1943 | Grinter | |
| 2,369,832 A | 2/1945 | Klose | |
| 2,383,491 A | 8/1945 | Kemmer et al. | |
| 2,650,047 A * | 8/1953 | Stoner et al. | 244/214 |
| 4,053,124 A * | 10/1977 | Cole | 244/219 |
| 4,247,065 A * | 1/1981 | Grob et al. | 244/215 |
| 4,312,486 A * | 1/1982 | McKinney | 244/215 |
| 4,427,169 A * | 1/1984 | Brown | 244/219 |
| 4,479,620 A * | 10/1984 | Rogers et al. | 244/195 |
| 4,765,572 A * | 8/1988 | Bellego et al. | 244/178 |
| 5,388,788 A * | 2/1995 | Rudolph | 244/215 |
| 5,918,832 A | 7/1999 | Zerweckh | |
| 6,220,551 B1 * | 4/2001 | Saiz | 244/217 |
| 6,257,528 B1 * | 7/2001 | Brislawn | 244/211 |
| 7,051,982 B1 * | 5/2006 | Johnson | 244/215 |
| 7,681,835 B2 * | 3/2010 | Simpson et al. | 244/123.3 |

* cited by examiner

*Primary Examiner* — Joseph W Sanderson
(74) *Attorney, Agent, or Firm* — Nydegger & Associates

(57) ABSTRACT

A trim tab is disclosed for use on an aerodynamic foil that has first and second surfaces which extend between a leading edge and a trailing edge. Structurally, the trim tab includes a tab member that is bounded by slits formed through each surface to extend from the trailing edge toward the leading edge. Also, the tab member is bounded by a slot formed between the slits on the second surface to establish a flange between the slot and the trailing edge. Further, the trim tab includes an actuator that is mounted on the foil between the slot and the leading edge. The actuator includes an actuator arm that is connected to the flange. As a result, extension and retraction of the actuator moves the tab member about a hinge-less tab that is created on the first surface.

15 Claims, 2 Drawing Sheets

LIVE TRIM TABS

FIELD OF THE INVENTION

The present invention pertains generally to airfoil controls for aircraft. More particularly, the present invention pertains to trim tabs for airfoils that are made as part of a unitary construction with the airfoil. The present invention is particularly, but not exclusively, useful as a combination trim tab and airfoil that is made of a composite material and that uses a hinge-less tab (hinge line) to interconnect the trim tab with the airfoil.

BACKGROUND OF THE INVENTION

Aircraft manufacturers continually strive for ways to improve aircraft efficiency and to reduce the costs that are associated with the manufacture and maintenance of aircraft. One factor that is always considered when trying to improve aircraft efficiency is to reduce the weight of the craft. For this purpose, composite materials have been considered and frequently used in place of heavier traditional materials. Accordingly, the use of composite materials for the manufacture of structural components has expanded considerably over the past years. In particular, composite materials that are made of carbon fibers and epoxy resins have been successfully used for the manufacture of various types of vehicles (e.g. cars, boats and airplanes). In part, this has happened because these materials are relatively light-weight, and they exhibit high strength in both tension and compression. They are also quite damage tolerant and resistant to puncture.

While composite materials are being increasingly used to construct components for many types of vehicles, aviation presents a unique set of concerns. Specifically, these concerns arise due to the fact aircraft necessarily include many dynamic control components. For instance, aircraft must necessarily include primary control surfaces such as elevators, ailerons and a rudder which, collectively, provide three-axis control (i.e. control of aircraft movements in pitch, roll and yaw). In flight, these structural surfaces are used to control the aircraft's movements. They are, however, subject to substantial aerodynamic forces and, consequently, can become unbalanced. When this happens, unless corrective action is taken, the aircraft is, basically, uncontrollable. To avoid this, the primary control surfaces typically have a trim tab whose sole purpose is to minimize and counterbalance disruptive aerodynamic forces that might otherwise be imposed on the control surface.

Structurally, a trim tab is a small airfoil that is hinged to the trailing edge of an aerodynamic control surface of an aircraft. Being an airfoil, a trim tab is capable of generating an aerodynamic force on its own. Functionally, as its name implies, a trim tab is used to trim (i.e. eliminate) unwanted aerodynamic forces on an aircraft's control surface. Stated differently, a trim tab is used to generate an aerodynamic force that will counter unwanted components of aerodynamic forces on the control surface. To do this, trim tabs need to be adjusted separately from movements of the control surface.

Heretofore, trim tabs have been manufactured as a separate aircraft component. The trim tab is then mounted on a hinge that is attached to a control surface. Further, the trim tab is provided with a separate control linkage for its movement relative to the control surface. With the increased interest in the use of composite materials for the manufacture of aircraft, however, there is also interest in minimizing the number of aircraft components that is possible by using such materials.

In light of the above, it is an object of the present invention to provide an airfoil and an integral trim tab that are made of a composite material. Another object of the present invention is to provide a method for manufacturing a composite material airfoil with an integral trim tab. Yet another object of the present invention is to provide a trim tab with a hinge-less tab for use on an airfoil. Still another object of the present invention is to provide a method for manufacturing an airfoil with an integral trim tab that is relatively simple and easy to implement and that is comparatively cost effective.

SUMMARY OF THE INVENTION

In accordance with the present invention, an aerodynamic foil (i.e. control surface) with a trim tab is manufactured as a single unitary piece and is constructed from composite materials. Structurally, the aerodynamic foil has a first surface and a second surface that each extend between a leading edge and a trailing edge of the foil. Further, a pair of substantially parallel slits is formed on the first surface and another pair is formed on the second surface. Each pair of slits extends perpendicularly from the trailing edge toward the leading edge. For purposes of the present invention, the slits on the first surface extend through a distance "$d_1$" from the trailing edge, and the slits on the second surface extend through a distance "$d_2$" from the trailing edge. Importantly, $d_1 > d_2$. With this construction, the slits and the trailing edge bound a trim tab member. Also, a slot is formed on the second surface between the slits at the distance "$d_2$" from the trailing edge. As a result, the second surface portion of the trim tab member creates a flange that is disconnected from the rest of the second surface of the foil. With this construction, the trim tab member is connected to the foil (i.e. control surface) only through the portion of the first surface that extends between the slits on the first surface. This inter-slit portion functions as a "so-called" hinge-less tab at the distance "$d_1$" from the trailing edge. Functionally, the trim tab member pivots about the "hinge-less tab."

Structurally, the trim tab member requires two spars. One, a base spar, extends between the first and second surfaces at a position near the slot, but between the slot and the leading edge. The other, a trailing spar, is also near the slot, is part of the trim tab member and extends between the first surface and the flange at a position between the slot and the trailing edge. Together, the base spar and trailing spar provide structural rigidity for the trim tab member.

In order to control the position of the trim tab member relative to the foil, the trim tab includes an actuator that is mounted on the foil. Specifically, the actuator is mounted on the foil at or near the base spar. Extending from the actuator is an actuator arm that connects the actuator to the trailing spar. In order to control the position of the trim tab member, the actuator either extends or retracts the actuator arm. In response to these movements, the trim tab member pivots about the hinge-less tab to change the aerodynamic forces on the foil for the purpose of trimming the aircraft.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
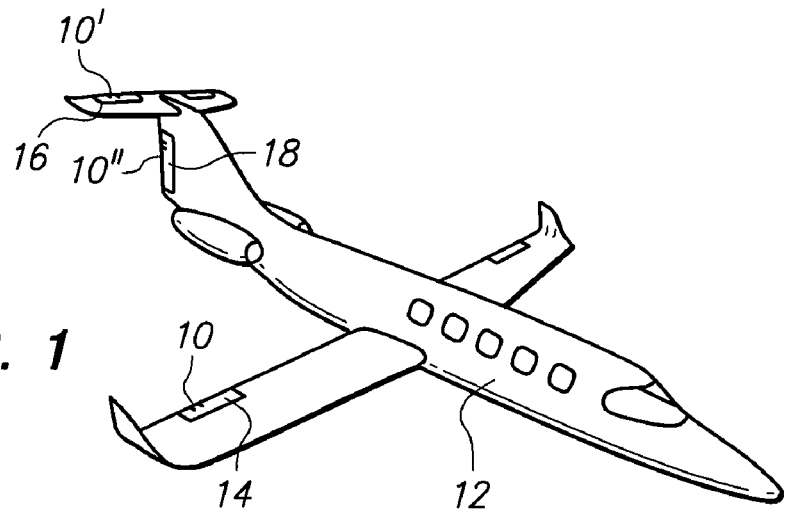
FIG. 1 is a perspective view of an aircraft equipped with trim tabs in accordance with the present invention.

Referring initially to FIG. 1, trim tabs for canceling unwanted aerodynamic forces are shown, and respectively designated 10, 10' and 10". As shown, the trim tabs 10, 10' and 10" are associated with selected control surfaces of the aircraft 12. Specifically, in FIG. 1 the trim tab 10 is shown associated with an aileron 14. Similarly, the trim tab 10' is associated with the elevator 16 and the trim tab 10" is associated with the rudder 18. As envisioned for the present invention, all of the trim tabs 10, 10' and 10" are structurally similar to each other and function in a similar manner for a same general purpose.

Figure 2A:
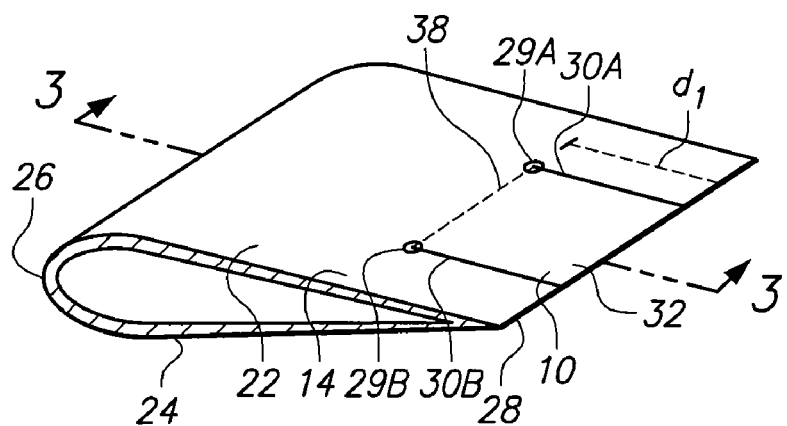
FIG. 2A is a perspective view of a portion of an airfoil shown in FIG. 1 looking down onto the first (upper) surface of the airfoil.
Figure 2B:
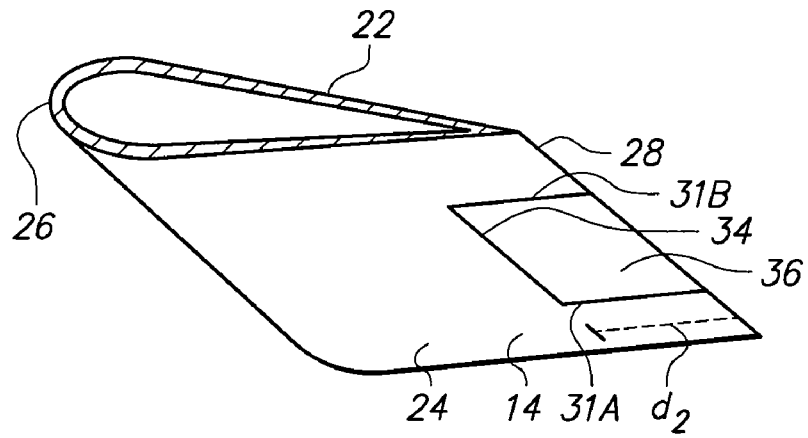
FIG. 2B is a perspective view of a portion of an airfoil shown in FIG. 1 looking up toward the second (lower) surface of the airfoil.

In FIGS. 2A and 2B, the trim tab 10 is shown in greater structural detail. As shown, the aileron 14 includes a surface 22 and a surface 24. Further, each surface 22, 24 extends from a leading edge 26 to a trailing edge 28. Also, each surface 22, 24 is formed with a pair of substantially parallel slits 30a and 30b. On the surface 22, the slits 30a, b extend from the trailing edge 28 toward the leading edge 26 through a distance "$d_1$" (see FIG. 2A). As shown in FIG. 2A, the slits 30a and 30b terminate at respective circular stress relief holes 29a and 29b to prevent crack formation. On the surface 24, however, the slits 31a, b extend from the trailing edge 28 toward the leading edge 26 through a distance "$d_2$" (see FIG. 2B). As shown, distance $d_1$ is greater than distance $d_2$ ($d_1 > d_2$). For purposes of disclosing the present invention, the slits 30a, b through the surface 22 and the slits 31a, b through the surface 24 bound a tab member 32.

In FIG. 2B, it can also be seen that the surface 24 includes a slot 34 that is substantially parallel to the trailing edge 28. As shown, the slot 34 connects the slits 31a, b at the distance "$d_2$" from the trailing edge 28. As a result, a flange 36 is formed that is structurally independent of the surface 24. Referring now to FIG. 2A, the tab member 32 is shown to be connected to the rest of the aileron (airfoil) 14 only along the hinge line 38.

Figure 3A:
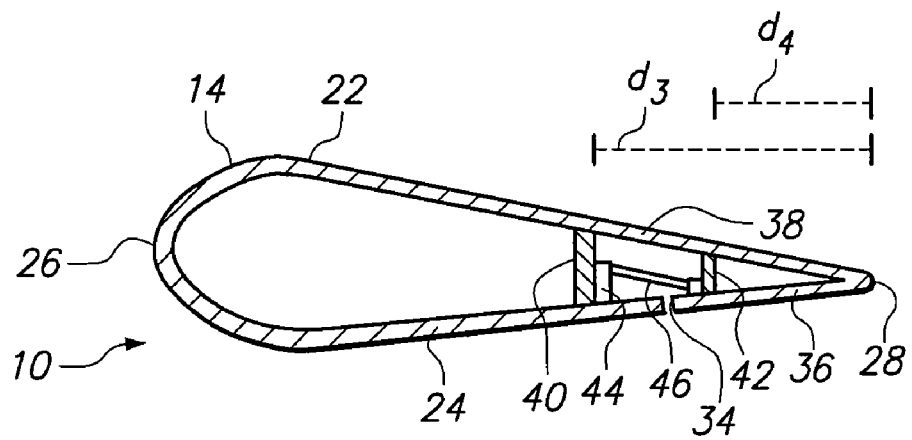
FIG. 3A is a cross sectional view of an airfoil as seen along the line 3-3 in FIG. 2A, when the trim tab is in a neutral position.
Figure 3B:
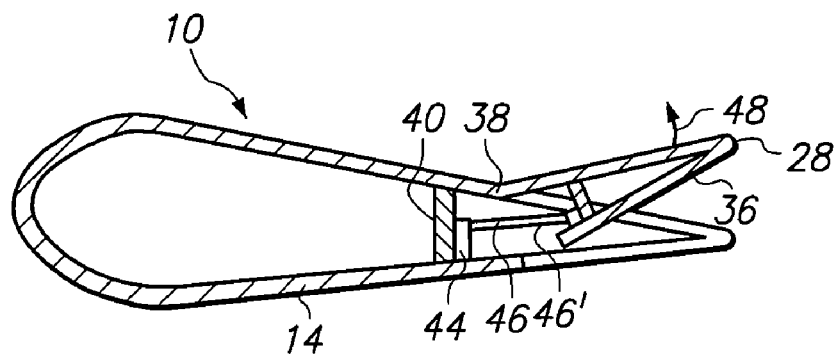
FIGS. 3B and 3C are cross sectional views similar to FIG. 3A illustrating the movement of the tab member about the hinge line in accordance with the present invention.

Referring now to FIG. 3A, the internal components of the trim tab 10 are illustrated. As shown, the trim tab 10 includes a base spar 40 that interconnects the surface 22 and the surface 24. As shown, the base spar 40 is positioned at a distance "$d_3$" from the trailing edge 28. Cross-referencing FIG. 3A with FIGS. 2A and 2B, it can be seen that $d_3 > d_1 > d_2$. Referring again to FIG. 3A, the trim tab 10 is further provided with a trailing spar 42. Similar to the base spar 40, the trailing spar 42 also interconnects the surface 22 and the surface 24. Further, the trailing spar 42 is positioned at a distance "$d_4$" from the trailing edge 28. Cross-referencing FIG. 3A with FIGS. 2A and 2B, it can be seen that $d_4 < d_2 < d_1$. In FIG. 3A, the trim tab 10 is also shown to include an actuator 44. Structurally, the actuator 44 is mounted to the aileron (airfoil) 14 through the base spar 40. Also, the actuator 44 is provided with an actuator arm 46 that extends from the actuator 44 toward the trailing edge 28. In FIG. 3A, it can be seen that the actuator arm 46 is connected to the flange 36 of the tab member 32. Operationally, the actuator arm 46 is designed for extension and retraction to selectively adjust the position of the flange 36 relative to the aileron 14. In FIG. 3B, the actuator arm 46 is shown in an extended configuration 46'. Specifically, the trim tab 10 is shown in FIG. 3B after the actuator 44 has extended the actuator arm 46. As a result of this extension, the distance between the flange 36 and the base spar 40 has increased. Further, the tab member 32 has pivoted about the hinge line 38 in the direction of arrow 48. In this manner, the aerodynamics of the aileron 14 have been selectively changed.

Figure 3C:
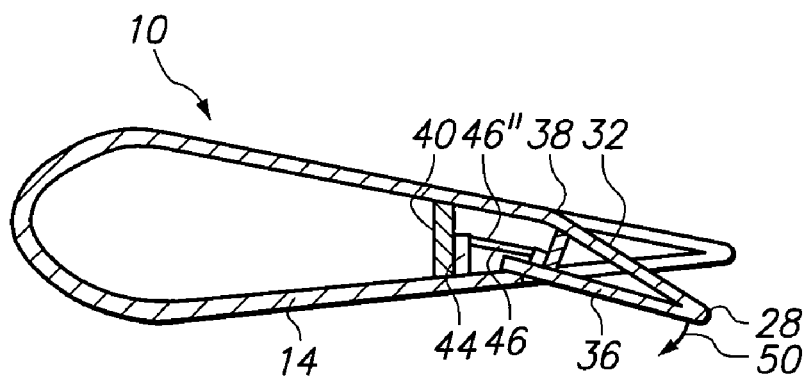

Referring now to FIG. 3C, the actuator arm 46 is shown in a retracted configuration 46". As shown, the actuator arm 46 has been retracted by the actuator 44 so that the distance between the flange 36 and the base spar 40 has decreased. Further, the tab member 32 has pivoted about the hinge line 38 in the direction of arrow 50. Again, the movement of the tab member 32 is selectively controlled to modify the aerodynamics of the aileron 14.

In addition to the illustrated structural aspects of the trim tab 10, it is noted that the aileron 14, tab member 32, base spar 40 and trailing spar 42 are formed from a composite material. Further, the aileron 14 and the tab member 32 are integral. Specifically, during construction of the trim tab 10, the aileron 14 is fabricated from composite material. During fabrication of the aileron 14, the base spar 40 and the trailing spar 42 are positioned in the aileron 14 to support the surface 22 and the surface 24. After the aileron 14 is fabricated, the slits 30a, b and 31a, b are formed in the surfaces 22, 24, thereby defining the tab member 32. Also, the slot 34 is created in the surface 24 to establish the flange 36. Therefore, the tab member 32 and the aileron 14 are integral, and are connected through the hinge line 38. As a result, the strength of the composite material is not compromised, and is utilized to allow pivoting of the tab member 32 about the hinge line 38. In order to control the movement of the tab member 32 about the hinge line 38, the actuator 44 is mounted to the aileron 14 and the actuator arm 46 is connected to the flange 36 through the trailing spar 42.

It will be appreciated by the skilled artisan that trim tabs 10' and 10" are, in all important respects, similar to the trim tab 10 disclosed above. Importantly, all tabs 10, 10' and 10" are essentially configured as a unitary construction, and are made of a same composite material.

While the particular Live Trim Tabs as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A trim tab for an aerodynamic foil having a first surface and a second surface respectively extending between a leading edge and a trailing edge, the trim tab comprising:

a tab member bounded by a pair of substantially parallel slits formed through the first surface, with the slits extending perpendicular from the trailing edge toward the leading edge through a distance "$d_1$" to a respective stress relief hole, and a pair of substantially parallel slits formed through the second surface and extending perpendicular from the trailing edge toward the leading edge through a distance "$d_2$", and a slot formed on the second surface at the distance "$d_2$" from the trailing edge and extending between the slits substantially parallel to the trailing edge to establish a flange between the slot and the trailing edge;

a base spar extending between the first and second surfaces at a distance "$d_3$" from the trailing edge $d_3 > d_2$;

a trailing spar extending between the first surface and the flange at a distance "$d_4$" from the trailing edge $d_4 < d_2$; and an actuator mounted on the base spar, with the actuator having an actuator arm connected to the trailing spar, wherein the actuator arm is selectively extendable and retractable to pivot the tab member about a hinge line created substantially parallel to the trailing edge at the distance "$d_1$" on the first surface between the base spar and the trailing spar and between the stress relief holes.

2. A trim tab as recited in claim 1 wherein the distance "$d_1$" is greater than the distance "$d_2$", $d_1 > d_2$.

3. A trim tab as recited in claim 1 wherein the aerodynamic foil, tab member, base spar and trailing spar are formed from a composite material.

4. A trim tab as recited in claim 1 wherein the aerodynamic foil is an aileron.

5. A trim tab as recited in claim 1 wherein the aerodynamic foil is a rudder.

6. An aerodynamic trim system for an aircraft comprising:

an aerodynamic foil having a first surface and a second surface respectively extending between a leading edge and a trailing edge;

a trim tab member bounded by a first pair of slits formed through the first surface, with the slits extending perpendicular from the trailing edge toward the leading edge to a respective stress relief hole, a second pair of slits formed through the second surface and extending perpendicular from the trailing edge toward the leading edge, and a slot formed on the second surface and extending between the second pair of slits to establish a flange between the slot and the trailing edge wherein a hinge line is created on the first surface substantially parallel to the trailing edge at a distance "$d_1$" from the trailing edge between the first pair of slits, and between the stress relief holes, opposite the slot formed on the second surface;

a base spar extending between the first and second surfaces at a position between the slot and the leading edge; and a trailing spar extending between the first surface and the flange at a position between the slot and the trailing edge; and an actuator mounted on the base spar, with the actuator having an actuator arm connected to the trailing spar, wherein the actuator arm is selectively extendable and retractable to pivot the tab member about the hinge line.

7. A system as recited in claim 6 wherein the first pair of slits formed through the first surface extend from the trailing edge toward the leading edge through a distance "$d_1$", and the second pair of slits formed through the second surface extend from the trailing edge toward the leading edge through a distance "$d_2$", with $d_1 > d_2$.

8. A system as recited in claim 7 wherein the base spar extends between the first and second surfaces at a distance "$d_3$" from the trailing edge $d_3 > d_2$, and wherein the trailing spar extends between the first surface and the flange at a distance "$d_4$" from the trailing edge $d_4 < d_2$.

9. A system as recited in claim 6 wherein the foil is formed from a composite material.

10. A system as recited in claim 6 wherein the aerodynamic foil is an aileron.

11. A system as recited in claim 6 wherein the aerodynamic foil is a rudder.

12. A method for manufacturing an aerodynamic trim device for an aircraft comprising:

fabricating an aerodynamic foil having a first surface and a second surface respectively extending between a leading edge and a trailing edge with a base spar positioned in the foil at a distance "$d_3$" from the trailing edge to extend between the first surface and the second surface, and a trailing spar positioned in the foil at a distance "$d_4$" from the trailing edge to extend between the first surface and the second surface;

forming a pair of slits in the first surface from the trailing edge toward the leading edge through a distance "$d_1$" to a respective stress relief hole, and a pair of slits in the second surface from the trailing edge toward the leading edge through a distance "$d_2$", with the slits and the trailing edge bounding a tab member, and wherein a hinge line is created substantially parallel to the trailing edge, at a distance "$d_1$" from the trailing edge on the first surface between the base spar and the trailing spar and between the stress relief holes;

creating a slot in the second surface between the slits at the distance "$d_2$" from the trailing edge to establish a flange between the slot and the trailing edge;

mounting an actuator on the base spar between the leading edge and the slot, with the actuator having an actuator arm; and connecting the actuator arm to the trailing spar, wherein the actuator arm is selectively extendable and retractable to pivot the tab member about the hinge line created on the first surface.

13. A method as recited in claim 12 wherein the distance "$d_1$" is greater than the distance "$d_2$", $d_1 > d_2$.

14. A method as recited in claim 12 wherein the aerodynamic foil, tab member, base spar and trailing spar are formed from a composite material.

15. A method as recited in claim 14 wherein the tab member and the aerodynamic foil are integral.

* * * * *